March 5, 1963 S. F. PLAISANCE 3,080,110

PHOTOELECTRICALLY CONTROLLED TAPE PUNCH

Filed Aug. 10, 1961 2 Sheets-Sheet 1

INVENTOR.
STANLEY F. PLAISANCE
BY
ALAN K. ROBERTS
ATTORNEY

INVENTOR.
STANLEY F. PLAISANCE
BY
ALAN K. ROBERTS
ATTORNEY 3,080,110
Patented Mar. 5, 1963

3,080,110

PHOTOELECTRICALLY CONTROLLED TAPE PUNCH

Stanley Francis Plaisance, Newton Center, Mass., assignor to Invac Corporation, Natick, Mass.
Filed Aug. 10, 1961, Ser. No. 130,546
5 Claims. (Cl. 234—82)

This invention relates to data processing systems and more particularly to circuits associated therewith.

The simultaneous printing of a character and the coding of the same in, for example, the form of holes in a paper tape involves two distinct operations. One of these operations concerns responding to a control, such as the depressing of a typewriter key, by printing a corresponding character. There are many known techniques for effecting this operation.

The other of these two operations may involve responding to said control simultaneously by effecting a coding operation including, for example, a tape punching operation. This parallel operation will present various problems which it is the object of this invention to avoid or overcome.

One of the aforenoted problems is that a single character of data when coded will normally be represented by a plurality of code markings which in turn may be represented by a plurality of code signals. It is an object of the invention in this respect to provide improved means and techniques to coordinate and synchronize these various signals.

Another of the aforenoted problems is that coding may involve a variety of specific functions to be performed in time sequence. It is a further object of the invention to provide improved means and techniques to enable the sequencing of such functions.

In accordance with one of its various aspects, the intion is related to a "center-select" technique. Stated otherwise, where a plurality of code signals may have undesirable time displacements, the invention provides for sampling said signals during a period when the signals are statistically likely to be simultaneously in valid form. To this end, the invention makes use of what may hereinafter be referred to as a "strobe" or sampling signal or pulse.

The invention is, however, concerned with more than simply providing solutions to the various problems indicated above. It is instead concerned with presenting the most direct and therefore economical solution.

To achieve the above and other objective, a circuit is proposed in accordance with the invention which responds to a strobe pulse by generating a sampling signal and a sequence of control signals. The techniques for establishing the strobe and control signals constitute features of the invention as do the overall system and the particular manner of providing the strobe signal.

The invention will be more clearly understood from the following detailed description of a preferred embodiment as illustrated in the accompanying drawing.

Figure 1:
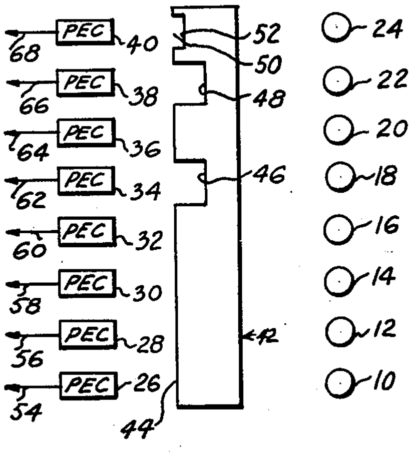
FIGURE 1 illustrates diagrammatically a photoelectric coding arrangement.

In FIG. 1 is illustrated a plurality of light sources 10, 12, 14, 16, 18, 20, 22 and 24. Also illustrated is a plurality of light sensitive devices or photoelectric cells 26, 28, 30, 32, 34, 36, 38 and 40. The light sources and photoelectric cells are arranged in pairs, each photoelectric cell being responsive to being isolated from the associated light source for generating an information signal.

In the arrangement of FIG. 1 is employed a plurality of shutter devices for selectively shielding the photoelectric cells from the associated light sources in accordance with a predetermined code. One shutter 42 is illustrated by way of example. Each shutter includes a leading edge 44 which moves into intercepting relationship under the control of a manually operated key or the like (not shown) of a typewriter or the like. The leading edge and the adjacent portions of the associated shutter constitute means for isolating the photoelectric cells from the corresponding light sources.

In accordance with known techniques and codes, if it is desired that a particular photoelectric cell not be isolated from the corresponding light source upon the operation of a particular shutter, that shutter is provided with an opening, such as openings 46 and 48, which enable the corresponding light sources and photoelectric cells to remain operatively coupled despite the interpositioning of said shutter. This enables a binary code to be employed in which two states are used corresponding to the coupling and isolation of the pairs of light sources and photoelectric cells. Each shutter has its own coded arrangements of openings.

In FIG. 1, photoelectric cells 26–38 are directly associated with the code which is adapted to represent data. Photoelectric cell 40, however, is not associated with the code but is instead intended for the generation of a strobe pulse. This pulse is generated at a period the beginning of which is delayed with respect to the leading edge of any of the data pulses.

To this end, each shutter is provided with a strobe opening 50, the leading edge 52 of which is offset relative to edge 44. As a result, the isolation of photoelectric cell 40 with respect to corresponding light source 24 is delayed relative to the isolation caused by leading edge 44. The purpose of this delay will become apparent hereinafter and for the meantime it is sufficient to note that photoelectric cells 26–40 transmit output pulses respectively via lines 54, 56, 58, 60, 62, 64, 66 and 68.

Figure 2:
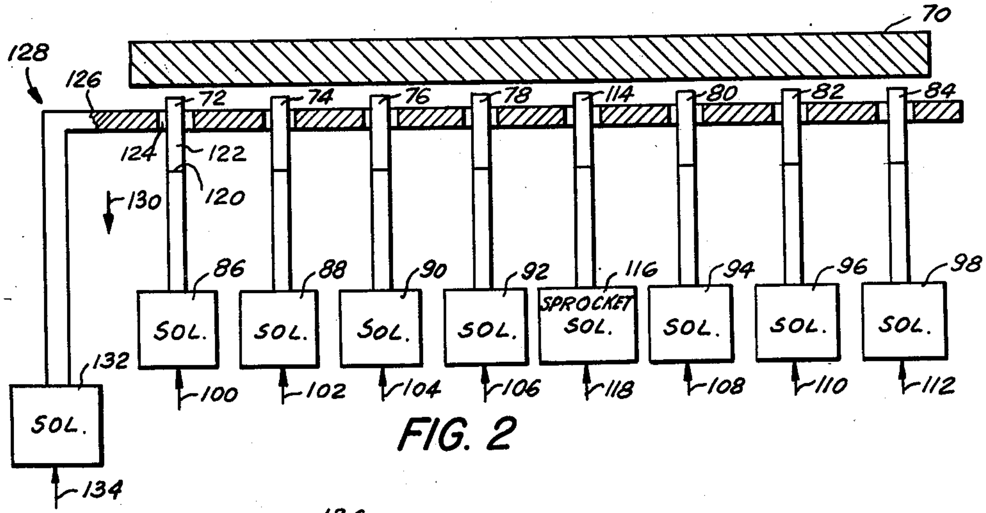
FIGURE 2 illustrates diagrammatically, and partially in section, a tape punching arrangement employed in accordance with the invention.

In FIG. 2 is shown, in cross-section, a paper tape 70. Although the invention is illustrated in connection with a paper tape and with the punching thereof, it will be apparent that this is illustrative only and that other type of record media and marking apparatus may be employed in connection with the invention.

For purposes of punching holes selectively in said tape 70, there are provided a plurality of tape punching pins 72, 74, 76, 78, 80, 82 and 84. The selective operation of these pins in accordance with, for example, a binary code, causes holes to be punched in tape 70 and this constitutes the recording of a coded character of data. Coupled to each of said pins respectively are solenoids 86, 88, 90, 92, 94, 96 and 98. These solenoids may be conventional electro-mechanical devices, electrically actuated for the mechanical displacement of the corresponding pins. Signals are fed to said solenoids by lines 100, 102, 104, 106, 108, 110 and 112 respectively.

A further tape punching pin is provided. This latter pin is, however, not related to the data which is to be recorded. This pin is, instead, a sprocket hole punching pin 114, which may hereinafter be referred to simply as the "sprocket pin."

Operatively coupled to the sprocket pin 114 is the sprocket solenoid 116 which is adapted to respond to an electrical signal to actuate said pin 114. Sprocket solenoid 116 receives an actuating signal via line 118.

Each of the aforenoted pins is provided with a shoulder 120 and includes a punching section 122 accommodated in a corresponding hole 124 in the horizontal arm 126 of a restoring bail 128. Restoring bail 128 is displaced in a direction indicated by arrow 130 under the influence of a restoring bail solenoid 132 actuated by means of an electrical signal received via line 134.

The restoring bail 128 is provided to avoid difficulties should one of the aforenoted punching pins become stuck in the tape 70 due to friction or the like, the restoring bail 128 providing the means whereby said pins are returned positively to a position of rest following each punching operation.

It is appreciated that the apparatus of FIG. 2 is illustrated only diagrammatically. However, no further details are essential to an understanding of the invention.

Figure 3:
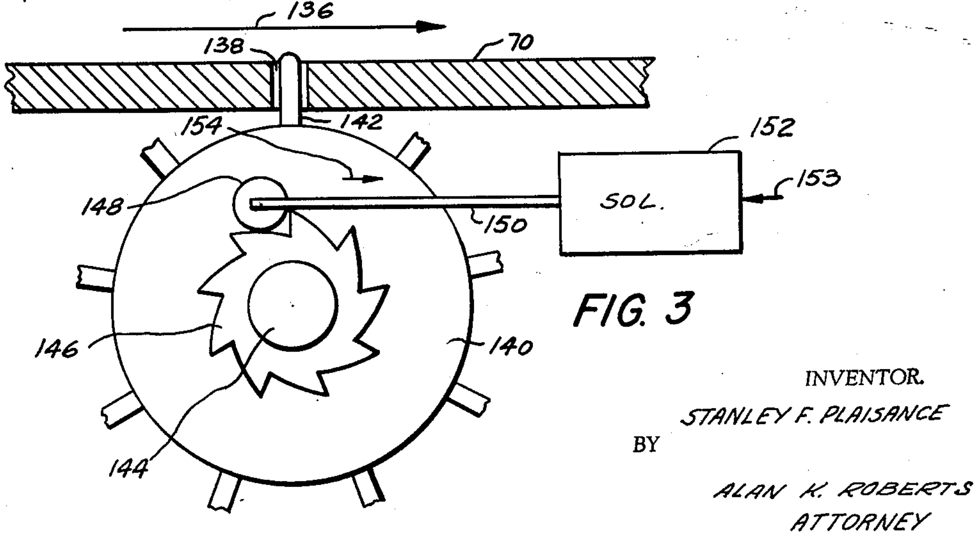
FIGURE 3 illustrates diagrammatically, and partially in section, a tape transporting mechanism employed in accordance with the invention.

FIG. 3 illustrates diagrammatically the technique which can be employed to step the tape 70 in the direction of arrow 136 following each punching operation so that code groups are spaced sequentially along said tape.

In FIG. 3, the tape 70 is shown with a sprocket hole 138 which has previously been punched in the tape 70 by means of sprocket pin 114.

Also shown in FIG. 3 is a sprocket wheel 140 having radially extending spokes 142 adapted for engaging sequential of the sprocket holes for purposes of transporting the tape.

Sprocket wheel 140 is fixed on a shaft 144 upon which is also fixed a ratchet wheel 146. This ratchet wheel is engaged by a roller 148 mounted on an armature 150 of a tape transport solenoid 152 which receives an actuating signal via line 153. Movement of armature 150 in the direction indicated by arrow 154 rotates the sprocket wheel 140 in clockwise direction thereby providing for movement of tape 70.

Figure 4:
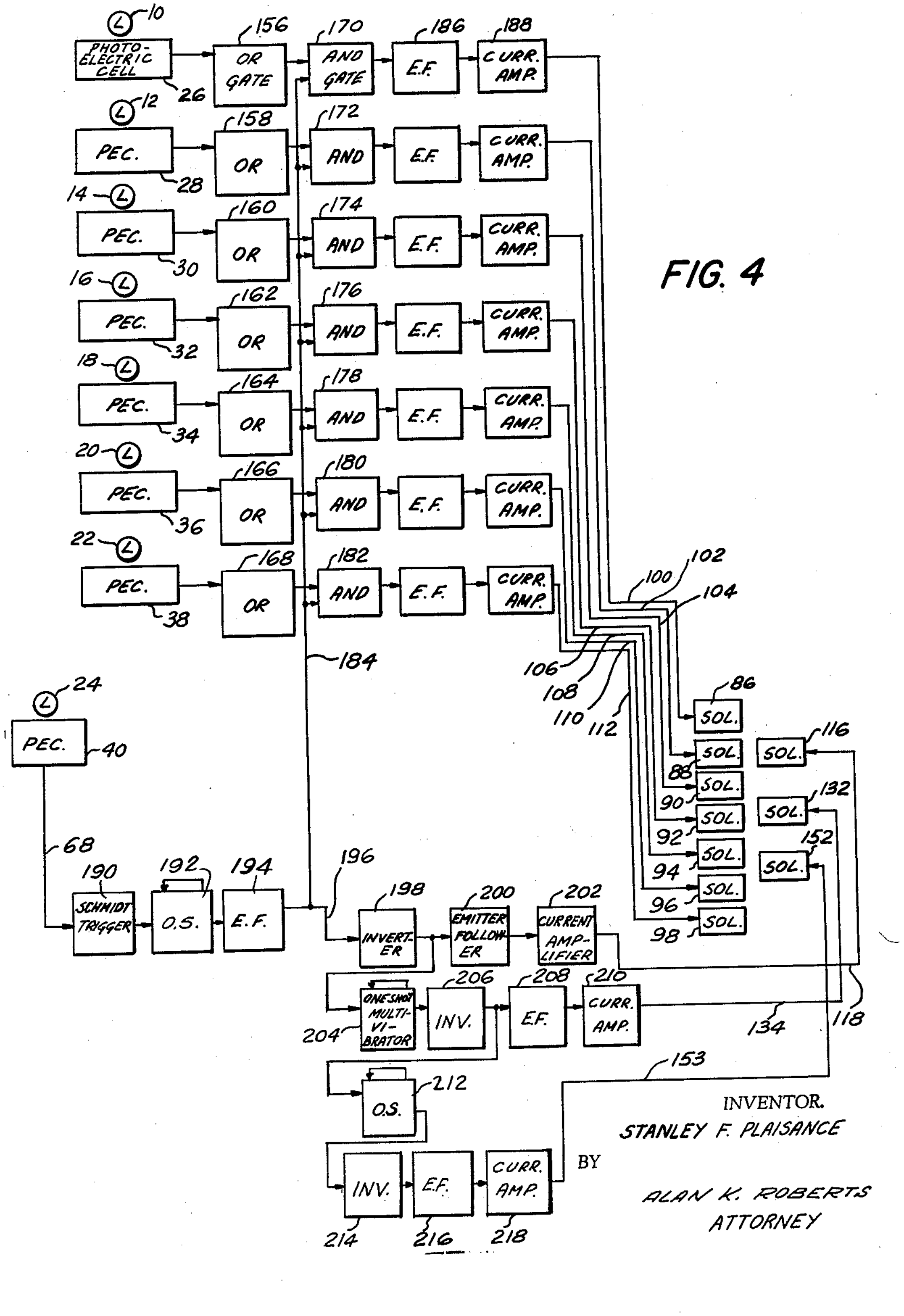
FIGURE 4 is a logical diagram employing a strobe pulse in accordance with the invention.

As stated above with respect to FIG. 2, the apparatus of FIG. 3 is illustrated only diagrammatically and only in such detail as is required to understand the operation of the logic diagram of FIG. 4.

Before a discussion of FIG. 4 is undertaken, it should be noted that a sequence of operations is predetermined with respect to the operation of the apparatus of FIGS. 1–3. Actuation of a shutter 42 of FIG. 1 in response to the operation of a typewriter key or the like initiates the actuation of the tape punching and sprocket pins. This is followed desirably by a restoration of said pins to their respective positions of rest following which the tape is stepped to the next recording position by the operation of the apparatus of FIG. 3. This sequencing, as well as a proper sampling of the signals generated by the aforesaid photoelectric cells is provided by the arrangement of FIG. 4.

In FIG. 4 are illustrated light sources 10–24 and photoelectric cells 26–40, the shutters 42 being omitted for purposes of clarity. It should now be recalled that the isolation of photo-electric cell 40 from light source 24 will be delayed with respect to the isolation of any of photoelectric cells 26–38 from the corresponding light sources when this latter isolation occurs.

Also illustrated in FIG. 4 are solenoids 86–98, as well as solenoids 116, 132 and 152 described above.

Signals generated by interrupting the passage of light from the various light sources to the corresponding photoelectric cells are fed via or-gates 156, 158, 160, 162, 164, 166 and 168 to and-gates 170, 172, 174, 176, 178, 180 and 182. These or-gates and and-gates may be of conventional construction and perform in conventional manner. Accordingly, the signals from the photoelectric cells pass through the corresponding or-gates and arrive at the corresponding and-gates where they are blocked pending the transmission to said and-gates of a concomitant priming or conditioning signal. This signal is selectively fed to said and-gates via line 184.

Assuming that a conditioning signal is available on line 184, such signals as exist are fed through said and-gates to corresponding emitter followers 186 and via current amplifiers such as current amplifier 188 to solenoids 86–98 via lines 100, 102, 104, 106, 108, 110 and 112 (see also FIG. 2). These signals selectively actuates solenoids 86–98 and the associated pins.

It will be recalled that the isolation of photoelectric cell 40 from light source 24 is delayed relative to the isolation of any of the data-signal generating photoelectric cells and corresponding light sources. The delayed signal for photoelectric cell 40 is, as noted above with respect to FIG. 1, transmitted via line 68. The signal passes to Schmidt trigger 190 which is a conventional circuit intended to sharpen the rise time of the signal transmitted from photoelectric cell 40.

From Schmidt trigger 190, the signal is passed to circuit 192, the inclusion of which constitutes one of the features of the invention.

Circuit 192 is a one-shot multivibrator which functions to generate a single output pulse of determinable duration. In accordance with the preferred embodiment of this invention, the duration of this pulse is about 15 microseconds. Other durations in the same general range are, however, also possible.

The duration of this pulse is based upon the desire of selecting a sample portion of the signals generated by photoelectric cells 26–30 and since the actuation and release of shutters 42 (see FIG. 1) is generally in the order from about 35 to 55 microseconds, the selection of a strobe or sampling pulse of about 15 microseconds duration enables the appropriate sampling of a central portion of the data pulses. This avoids the effects of chatter, circuit delays and the like.

The priming or conditioning signal from circuit 192 is fed via emitter follower 194 to line 184 whereby the strobe pulse is applied to and-gates 170–182 so that solenoids 86–98 can be actuated. It will be appreciated that the solenoids, due to the controlled conditioning of gates 170–182, will not be accidentally or improperly actuated but will instead be actuated only upon a sampling of valid data signals.

The signal which is applied to line 184 is applied, as well, to line 196, which is connected to inverter 198, the purpose of which will become apparent immediately below.

However, before the purpose of inverter 198 is made clear, it is to be noted that the inverter feeds the pulse received from line 196 to emitter follower 200 and then via current amplifier 202 to line 118 which feeds sprocket solenoid 116 (see also FIG. 2). Thus, sprocket solenoid 116 is actuated simultaneously with solenoids 86–98 so that all of the holes which are to be punched in tape 70 are punched at the same time.

Inverter 198 also feeds one-shot multivibrator 204. This conventionally responds as does one-shot multivibrator 192 to the rising edge of the signal applied thereto. Thus, since inverter 198 inverts the pulse applied thereto, the signal generated by one-shot multivibrator 204 is delayed by the width of the pulse received by inverter 198. In other words, one-shot multivibrator 204 initiates the generation of its pulse upon termination of the pulse generated by one-shot multivibrator 192. This is a delay mechanism employed for sequencing purposes as will be shown below.

One-shot multivibrator 204 feeds its signal via inverter 206, emitter follower 208 and current amplifier 210 to line 134 which controls the actuation of restoring bail solenoid 132. The actuation of solenoid 132 is therefore delayed with respect to the actuation of solenoid 116 by the duration of the pulse generated by circuit 192. Inverter 206 also applied its output pulse to one-shot multivibrator 212 which feeds its output signal via inverter 214, emitter follower 216 and current amplifier 218 to line 153. This controls the actuation of tape transporting solenoid 152 which was described above.

The second inversion of the pulse and the subsequent generation of the pulse by circuit 212 delays the actuation of solenoid 152 in the manner described above by the width of the pulse so that the operation of solenoid 152 follows sequentially the operation of solenoid 132.

From the above it will be seen that, in a first step, solenoid 116 and selected of solenoids 86–98 are actuated followed by an actuation of solenoid 132 followed by an actuation of tape transport solenoid 152. This provides sequentially for recording data while simultaneously punching sprocket holes, restoring the punching pins to positions of rest and moving the tape to the next position.

It will also be understood that solenoids 86–98 are not actuated by the leading and generally irregular initial portions or leading edges of the signals generated by photoelectric cells 26–38. This is due, as noted above, to the fact that these signals are blocked by and-gates 170–182 until a strobe or signaling pulse is generated by circuit 192. It will also be appreciated that this advantageous feature is provided by the use of a very simple circuit.

It will be further realized that a feature of the invention involves the provision of sequencing delays by the simple expedient of inverting pulses applied to a sequence of one-shot multivibrators or the like.

There will now be obvious to those skilled in the art many modifications and variations of the apparatus and techniques set forth above. These modifications and variations will not, however, depart from the scope of the invention if defined by the following claims.

What is claimed is:

1. A data processing system comprising a plurality of tape punching pins adapted for executing tape punching movements, a sprocket pin adapted for punching sprocket holes in the tape, tape transporting means adapted for engaging said sprocket holes to move the tape past said tape punching pins, a plurality of solenoids coupled to said tape punching and sprocket pins for operating the same and to said tape transporting means to operate the same, photoelectric cells and light sources corresponding to said tape punching pins, shutters including means for selectively isolating said cells from said sources, gates coupling said cells to the solenoids operating said tape punching pins, a further photoelectric cell and light source, said shutters including means to isolate said further cell from said further source at a time delayed with respect to the isolation of the first said cells and sources, a pulse sharpening device connected to said further cell, a one-shot multivibrator coupled to said pulse sharpening device and responsive to the same for generating a pulse of predetermined length, said multivibrator being coupled to said gates to condition the latter to pass signals from the associated cells to the associated solenoids in response to said pulse, a pulse inverter coupling said multivibrator to the solenoid operating said sprocket pin for operating the same simultaneously with said tape punching pins, and a further one-shot multivibrator coupled between said inverter and the solenoid operating said tape transporting means and operating the latter following the operation of said tape punching pins.

2. A data processing system comprising a plurality of tape punching pins adapted for executing tape punching movements, a restoring bail operatively coupled to said pins for restoring the same to a position of rest, tape transporting means adapted to move the tape past said tape punching pins, a plurality of solenoids coupled to said tape punching pins for operating the same, solenoids coupled to said restoring bail and tape transporting means to operate the same, photoelectric cells and light sources corresponding to said tape punching pins, shutters including means for selectively isolating said cells from said sources, gates coupling said cells to the solenoids operating said tape punching pins, a further photoelectric cell and light source, said shutters including means to isolate said further cell from said further source at a time delayed with respect to the isolation of the first said cells and sources, a one-shot multivibrator coupled to said further cell and responsive to the same for generating a pulse of predetermined length, said multivibrator being coupled to said gates to condition the latter to pass signals from the associated cells to the associated solenoids in response to said pulse, a pulse inverter coupled to said multivibrator, a second one-shot multivibrator coupled to said inverter and to the solenoid operating the restoring bail to operate the latter at the termination of the pulse generated by the first said multivibrator, a third one-shot multivibrator, and a further inverter coupling said third multivibrator to said second multivibrator, said third multivibrator being coupled to the solenoid operating said tape transporting means and operating the latter at the termination of the operation of said restoring bail.

3. A data processing system comprising a plurality of tape punching pins adapted for executing tape punching movements, a restoring bail operatively coupled to said pins for restoring the same to a position of rest, a sprocket pin adapted for punching sprocket holes in the tape, a plurality of solenoids coupled to said tape punching and sprocket pins and to said restoring bail to operate the same, photoelectric cells and light sources corresponding to said tape punching pins, shutters including means for selectively isolating said cells from said sources, gates coupling said cells to the solenoids operating said tape punching pins, a further photoelectric cell and light source, said shutters including means to isolate said further cell from said further source at a time delayed with respect to the isolation of the first said cells and sources, a one-shot multivibrator coupled to said further cell and responsive to the same for generating a pulse of pre-determined length, said multivibrator being coupled to said gates to condition the latter to pass signals from the associated cells to the associated solenoids in response to said pulse, a pulse inverter coupling said multivibator to the solenoid operating said sprocket pin for operating the same simultaneously with said tape punching pins, and a second one-shot multivibrator coupled to said inverter and to the solenoid operating the restoring bail to operate the latter at the termination of the pulse generated by the first said multivibrator.

4. In a data processing system comprising a plurality of tape punching pins adapted for executing tape punching movements, a restoring bail operatively coupled to said pins for restoring the same to a position of rest, a sprocket pin adapted for punching sprocket holes in the tape, tape transporting means adapted for engaging said sprocket holes to move the tape past said tape punching pins, a plurality of solenoids coupled to said tape punching and sprocket pins for operating the same, solenoids coupled to said restoring bail and tape transporting means to operate the same, the improvement comprising photoelectric cells and light sources corresponding to said tape punching pins, shutters including means for selectively isolating said cells from said sources, gates coupling said cells to the solenoids operating said tape punching pins, a further photoelectric cell and light source, said shutters including means to isolate said further cell from said further source at a time delayed with respect to the isolation of the first said cells and sources, a pulse sharpening device connected to said further cell, a one-shot multivibrator coupled to said pulse sharpening device and responsive to the same for generating a pulse of predetermined length, said multivibrator being coupled to said gates to condition the latter to pass signals from the associated cells to the associated solenoids in response to said pulse, a pulse inverter coupling said multivibrator to the solenoid operating said sprocket pin for operating the same simultaneously with said tape punching pins, a second one-shot multivibrator coupled to said inverter and to the solenoid operating the restoring bail to operate the latter at the termination of the pulse generated by the first said multivibrator, a third one-shot multivibrator, and a further inverter coupling said third multivibrator to said second multivibrator, said third multivibrator being coupled to the solenoid operating said tape transporting means and operating the latter at the termination of the operation of said restoring bail.

5. A data processing system comprising a plurality of tape punching pins adapted for executing tape punching movements, a restoring bail operatively coupled to said pins for restoring the same to a position of rest, a sprocket pin adapted for punching sprocket holes in the tape, tape transporting means adapted for engaging said sprocket holes to move the tae past said tape punching pins, a plurality of solenoids coupled to said tape punching and sprocket pins for operating the same, solenoids coupled to said restoring bail and tape transporting means to operate the same, photoelectric cells and light sources corresponding to said tape punching pins, shutters including means for selectively isolating said cells from said sources, gates coupling said cells to the solenoids operating said tape punching pins, a further photoelectric cell and light source, said shutters including means to isolate said further cell from said further source at a time delayed with respect to the isolation of the first said cells and sources, a pulse sharpening device connected to said further cell, a one-shot multivibrator coupled to said pulse sharpening device and responsive to the same for generating a pulse of predetermined length, said multivibrator being coupled to said gates to condition the latter to pass signals from the associated cells to the associated solenoids in response to said pulse, a pulse inverter coupling said multivibrator to the solenoid operating said sprocket pin for operating the same simultaneously with said tape punching pins, a second one-shot multivibrator coupled to said inverter and to the solenoid operating the restoring bail to operate the latter at the termination of the pulse generated by the first said multivibrator, and a third one-shot multivibrator, a further inverter coupling said third multivibrator to said second multivibrator, said third multivibrator being coupled to the solenoid operating said tape transporting means and operating the latter at the termination of the operation of said restoring bail.

References Cited in the file of this patent

UNITED STATES PATENTS

| | | |
|---|---|---|
| 2,760,063 | Andrews | Aug. 21, 1956 |
| 2,907,989 | Guerber | Oct. 6, 1959 |
| 3,032,163 | Flieg | May 1, 1962 |